US011372171B2

(12) United States Patent
Hodge et al.

(10) Patent No.: US 11,372,171 B2
(45) Date of Patent: Jun. 28, 2022

(54) LENSED OPTICAL FIBER CONNECTOR WITH FEEDBACK MIRROR ASSEMBLY

(71) Applicant: Molex, LLC, Lisle, IL (US)

(72) Inventors: Malcolm H. Hodge, Wheaton, IL (US); Russell K. Stiles, Kingston, TN (US)

(73) Assignee: Molex, LLC, Lisle, IL (US)

(*) Notice: Subject to any disclaimer, the term of this patent is extended or adjusted under 35 U.S.C. 154(b) by 0 days.

(21) Appl. No.: 17/293,720

(22) PCT Filed: Nov. 14, 2019

(86) PCT No.: PCT/US2019/061347
§ 371 (c)(1),
(2) Date: May 13, 2021

(87) PCT Pub. No.: WO2020/102465
PCT Pub. Date: May 22, 2020

(65) Prior Publication Data
US 2022/0011523 A1    Jan. 13, 2022

Related U.S. Application Data

(60) Provisional application No. 62/760,990, filed on Nov. 14, 2018.

(51) Int. Cl.
G02B 6/36 (2006.01)
G02B 6/38 (2006.01)
G02B 6/40 (2006.01)

(52) U.S. Cl.
CPC ......... *G02B 6/3853* (2013.01); *G02B 6/3895* (2013.01); *G02B 6/403* (2013.01)

(58) Field of Classification Search
CPC .... G02B 6/3853; G02B 6/3895; G02B 6/403; G02B 6/36
See application file for complete search history.

(56) References Cited

U.S. PATENT DOCUMENTS 4,733,047 A * 3/1988 Cruickshank ........ B23K 26/067
219/121.63
5,359,192 A    10/1994 Williams et al.
(Continued)

FOREIGN PATENT DOCUMENTS

CN    1771448 A    5/2006
CN    103597393 A    2/2014
(Continued)

OTHER PUBLICATIONS

Office action received for JP Application No. 2021-512571, dated Sep. 14, 2021, 19 pages (10 pages of English Translation and 9 pages of original office action).
(Continued)

*Primary Examiner* — Jennifer Doan

(57) ABSTRACT

An optical fiber assembly has a first ferrule assembly and a second ferrule assembly. Each ferrule assembly has a ferrule body, a plurality of optical fiber receiving bores, and an array of optical elements. One of array of optical elements has a plurality of data lens elements and a cross-focusing indicator lens element. Another of the array of optical elements has a plurality of data lens elements and a mirror system configured to reflect light from the indicator lens element. Upon mating the first and second ferrule assemblies, light from the indicator lens element is primarily reflected back to an output lens element by the mirror system. Upon only partially mating the first and second ferrule assemblies, light from the indicator lens element is not primarily reflected back by the mirror system to the output lens element.

20 Claims, 9 Drawing Sheets

(56) References Cited

U.S. PATENT DOCUMENTS

| | | | |
|---|---|---|---|
| 5,666,450 | A | 9/1997 | Fujimura et al. |
| 5,784,377 | A | 7/1998 | Baydar et al. |
| 5,907,651 | A | 5/1999 | Bunin et al. |
| 5,930,017 | A | 7/1999 | Davis et al. |
| 6,049,550 | A | 4/2000 | Baydar et al. |
| 6,240,087 | B1 | 5/2001 | Cummings et al. |
| 6,275,499 | B1 | 8/2001 | Wynn et al. |
| 6,285,673 | B1 | 9/2001 | Blackbum et al. |
| 6,333,940 | B1 | 12/2001 | Baydar et al. |
| 6,363,078 | B1 | 3/2002 | Garcia et al. |
| 6,389,013 | B1 | 5/2002 | Doss et al. |
| 6,567,402 | B1 | 5/2003 | Jones et al. |
| 6,587,618 | B2 | 7/2003 | Raguin et al. |
| 6,608,844 | B1 | 8/2003 | Teodorescu et al. |
| 7,079,555 | B2 | 7/2006 | Baydar et al. |
| 8,150,019 | B2 | 4/2012 | Smith |
| 8,262,297 | B2 | 9/2012 | Castagna et al. |
| 8,616,781 | B2 | 12/2013 | Knapp |
| 8,827,567 | B2 | 9/2014 | Grinderslev |
| 9,065,572 | B1 | 6/2015 | Wach |
| 9,405,076 | B2 * | 8/2016 | Chen .................... G02B 6/32 |
| 9,529,155 | B2 * | 12/2016 | Bhagavatula ........ G02B 6/3885 |
| 2016/0259132 | A1 * | 9/2016 | Ling .................... G02B 6/3866 |
| 2017/0168244 | A1 | 6/2017 | Rubino et al. |

FOREIGN PATENT DOCUMENTS

| | | |
|---|---|---|
| CN | 103620462 A | 3/2014 |
| EP | 2581776 A1 | 4/2013 |
| EP | 3182182 A1 | 6/2017 |
| JP | H05203829 A | 8/1993 |
| JP | 2001083365 A | 3/2001 |
| JP | 2006515687 A | 6/2006 |
| JP | 2006526167 A | 11/2006 |
| JP | 5184708 B1 | 4/2013 |
| JP | 2013064803 A | 4/2013 |
| JP | 2014526720 A | 10/2014 |
| JP | 2016061847 A | 4/2016 |
| JP | 2018156004 A | 10/2018 |
| TW | M453860 U | 5/2013 |
| WO | 2004066006 A1 | 8/2004 |
| WO | 2018030246 A1 | 2/2018 |
| WO | 2020102465 A1 | 5/2020 |

OTHER PUBLICATIONS

International Search Report and Written Opinion received for PCT Application No. PCT/US2019/061347, dated Mar. 9, 2020, 7 Pages.

* cited by examiner

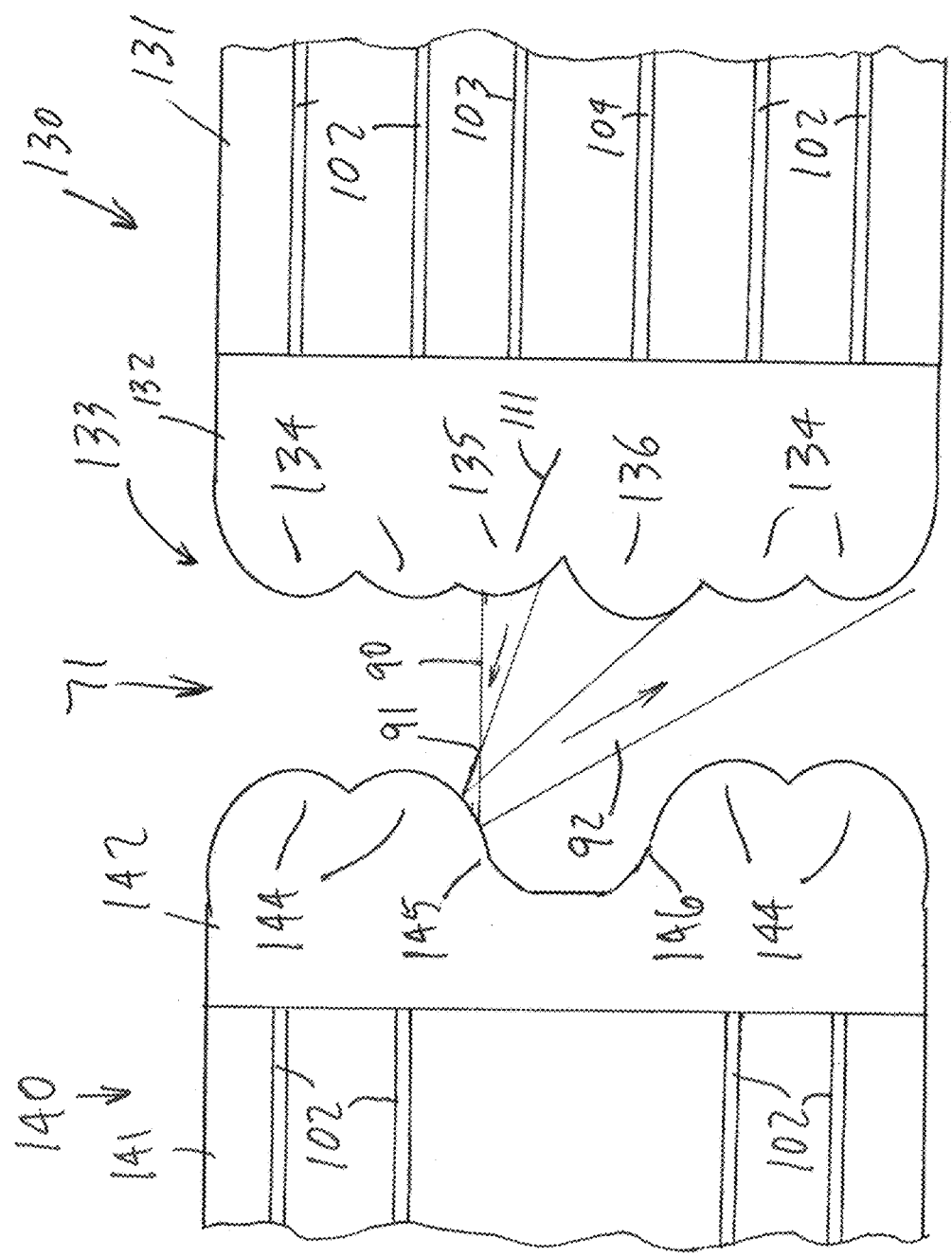

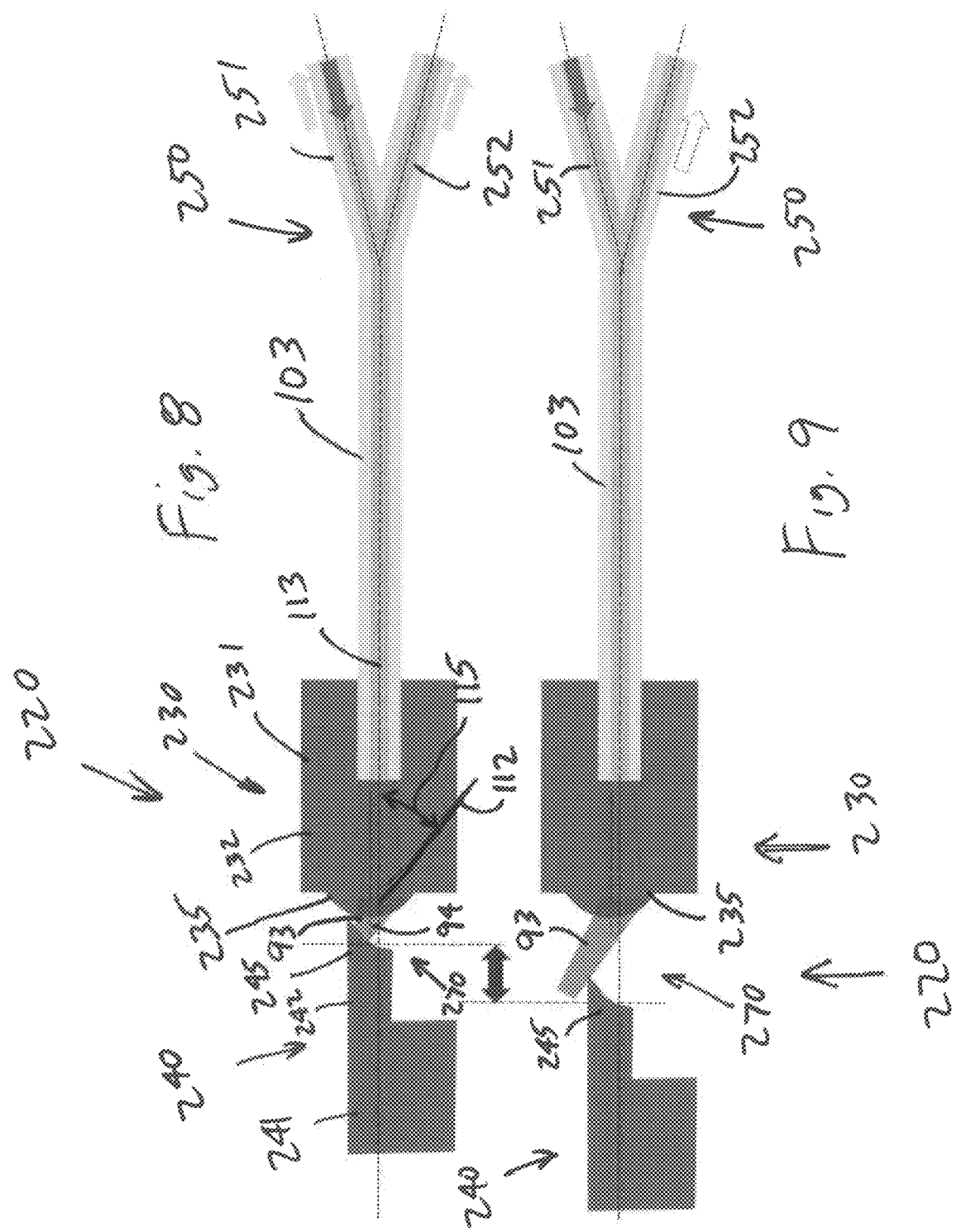

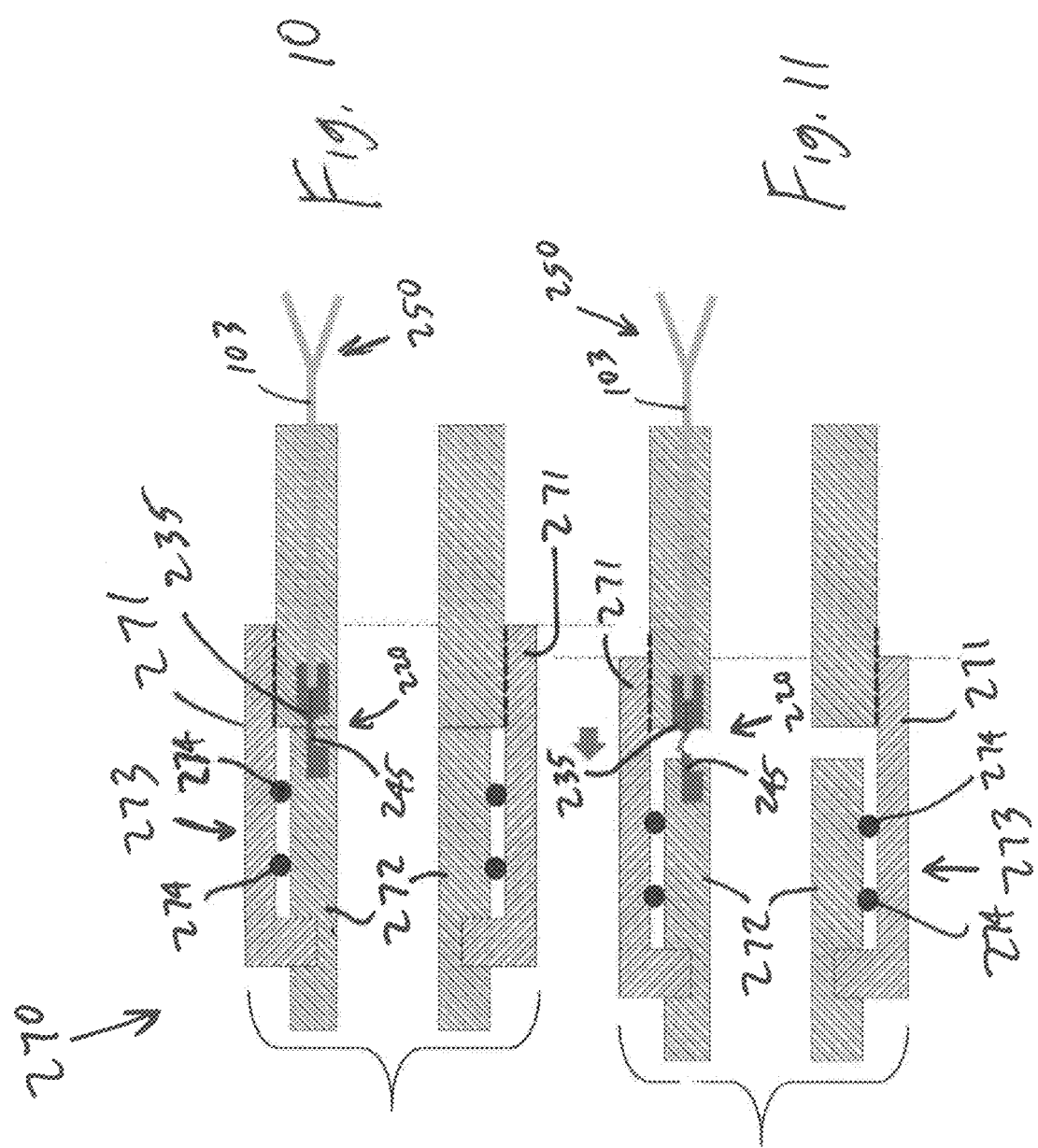

LENSED OPTICAL FIBER CONNECTOR WITH FEEDBACK MIRROR ASSEMBLY

RELATED APPLICATIONS

This application is a National Phase of International Application No. PCT/US2019/061347 filed on Nov. 14, 2019, which claims priority to U.S. Provisional Application 62/760,990, filed Nov. 14, 2018.

TECHNICAL FIELD

The present disclosure relates generally to lensed optical fiber ferrule assemblies, and, more particularly, to a mating assembly in which one component has a ferrule and lens and a second component has an aligned mirror system.

BACKGROUND

Systems for interconnecting optical fibers typically utilize mating ferrule assemblies to facilitate handling and accurate positioning of the fibers. The optical fibers are secured within a ferrule body, with an end surface of each fiber being positioned generally flush with or slightly protruding from an end face of the ferrule body. The end surfaces or faces of the fibers are then polished to a desired finish. When complementary ferrules assemblies are mated, each optical fiber of a ferrule assembly is coaxially positioned with a mating optical fiber of the other ferrule assembly.

In some applications, the end faces of the mating optical fibers physically contact one another in order to effect signal transmission between the mating optical fiber pair. In such applications, various factors may reduce the efficiency of the light transmission between the optical fiber pair such as irregularities, burrs or scratches in the fiber end faces, misalignment of the fibers as well as dust or debris between the fibers at the mating interface.

Due to the small optical path relative to the size of any foreign objects such as dust or debris, any such foreign objects will likely interfere with the transmission of light. Expanded beam connectors expand the width of the optical beam and transmit the beam over an air gap between the connectors. By expanding the beam, the relative size difference between the dust or debris and the beam is increased which thus reduces the impact of any dust or debris as well as any misalignment on the efficiency of the light transmission.

Expanded beam connectors include a lens mounted adjacent an end face of each fiber. Two types of lenses are commonly used—collimating and cross-focusing. A collimating lens receives the light from the fiber and expands the beam to a relatively large diameter. When using a collimating lens, a second lens and ferrule assembly is similarly configured with the lens positioned adjacent the end face of the second fiber for receiving the expanded beam and refocusing the beam at the end face of the second fiber.

Due to the collimated nature of the light beam used with collimating lenses, signals may pass between collimating lenses without significant power loss even when the ferrule assemblies are slightly unmated. Accordingly, in some applications. it may be desirable to provide a switch or indicator that a pair of ferrule assemblies are not fully mated.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a ferrule assembly has a mating axis and includes a ferrule body having a front face and a plurality of optical fiber receiving bores. An element array is adjacent the front face of the ferrule body and has a plurality of lens elements. Each lens element is aligned with one of the optical fiber receiving bores and the element array comprises a plurality of data lens elements and an indicator lens element. The indicator lens element is a cross-focusing lens. A plurality of optical fibers are each disposed within one of the optical fiber receiving bores, with each optical fiber having an end face adjacent one of the lens elements.

In another aspect, a ferrule assembly has a mating axis and includes a ferrule body having a front face and a plurality of optical fiber receiving bores. An element array is adjacent the front face of the ferrule body and has a plurality of data lens elements and a mirror system. Each data lens element is aligned with one of the optical fiber receiving bores, and the mirror system is configured to reflect light from a mating ferrule assembly. A plurality of optical fibers are each disposed within one of the optical fiber receiving bores, with each optical fiber having an end face adjacent one of the data lens elements.

An optical fiber assembly has a first ferrule assembly and a second ferrule assembly. Each ferrule assembly has a ferrule body, a plurality of optical fiber receiving bores, an optical fiber within each bore, and an element array. A first element array has a plurality of lens elements with each lens element being aligned with a first optical fiber receiving bores. The first element array includes a plurality of data lens elements each aligned with one of the first optical fiber receiving bores and an indicator lens element, with the indicator lens element being a cross-focusing lens. A second element array has a plurality of data lens elements and a mirror system. Each data lens element is aligned with one of a second optical fiber receiving bores, and the mirror system is configured to reflect light from the indicator lens element of the first ferrule assembly.

BRIEF DESCRIPTION OF THE DRAWINGS

FIG. 7 depicts a schematic assembly similar to FIG. 6 but with the ferrule assemblies in a slightly unmated configuration;

FIG. 8 depicts a schematic view of another embodiment of a full mating detection system;

FIG. 9 depicts a schematic assembly similar to FIG. 8 but with the full mating detection system in a slightly unmated configuration;

FIG. 10 depicts a schematic view of a pair of hose couplings incorporating the full mating detection system of FIG. 8; and FIG. 11 depicts a schematic assembly similar to FIG. 10 but with the hose couplings and full mating detection system in a slightly unmated configuration.

DETAILED DESCRIPTION

Figure 1:
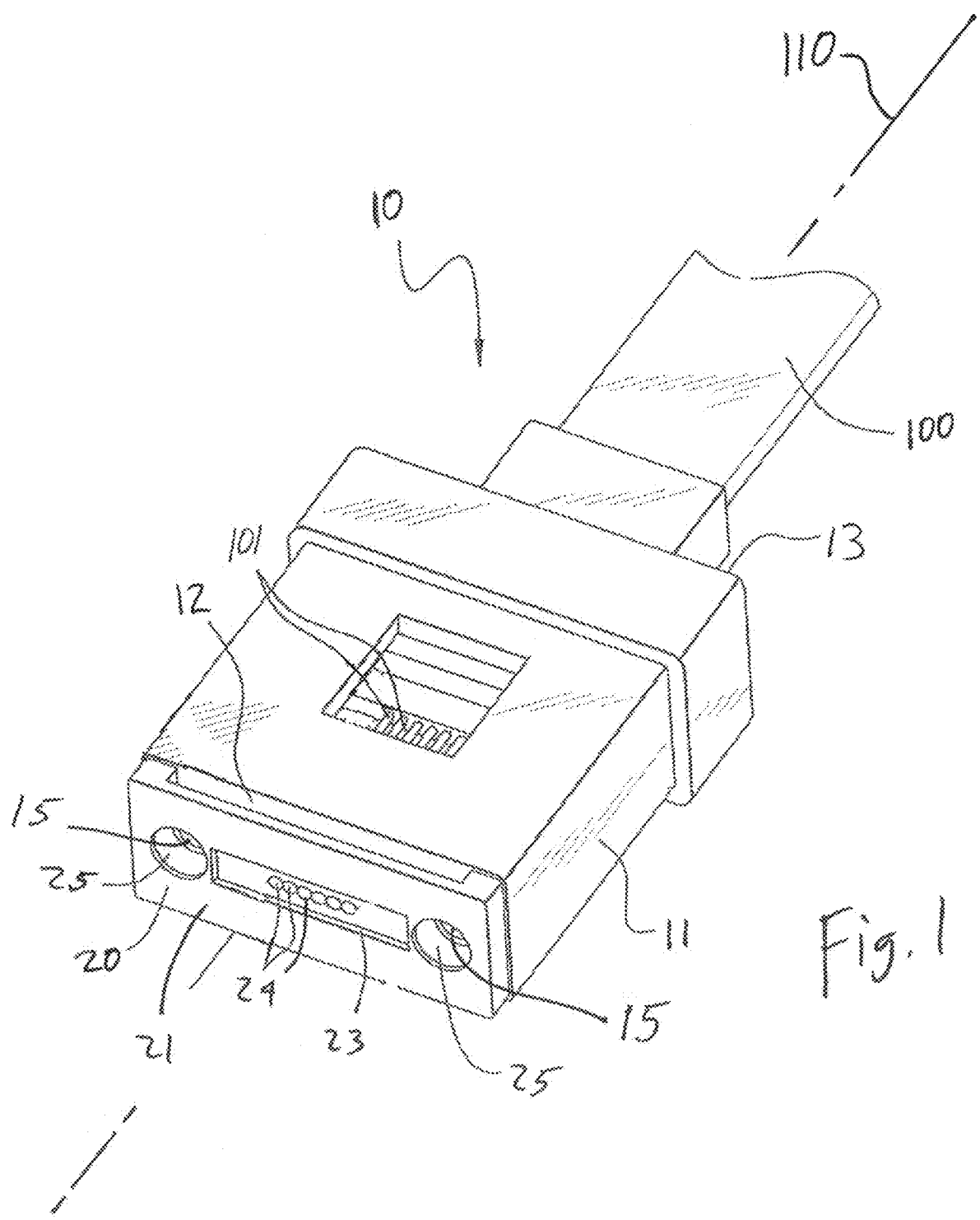
FIG. 1 depicts a perspective view of a ferrule assembly in which the principles of the present disclosure are incorporated.

Referring to FIG. 1, an exemplary multi-fiber lensed ferrule assembly 10 is illustrated. The ferrule assembly 10 includes a ferrule body 11, a light expanding element such as lens plate 20, and to a multi-fiber cable 100 having a plurality of optical fibers 101 aligned along a ferrule assembly axis 110. As depicted, ferrule assembly 10 includes a row of six optical fibers 101 although the ferrule assembly could be configured to receive greater or fewer optical fibers if desired.

Figure 2:
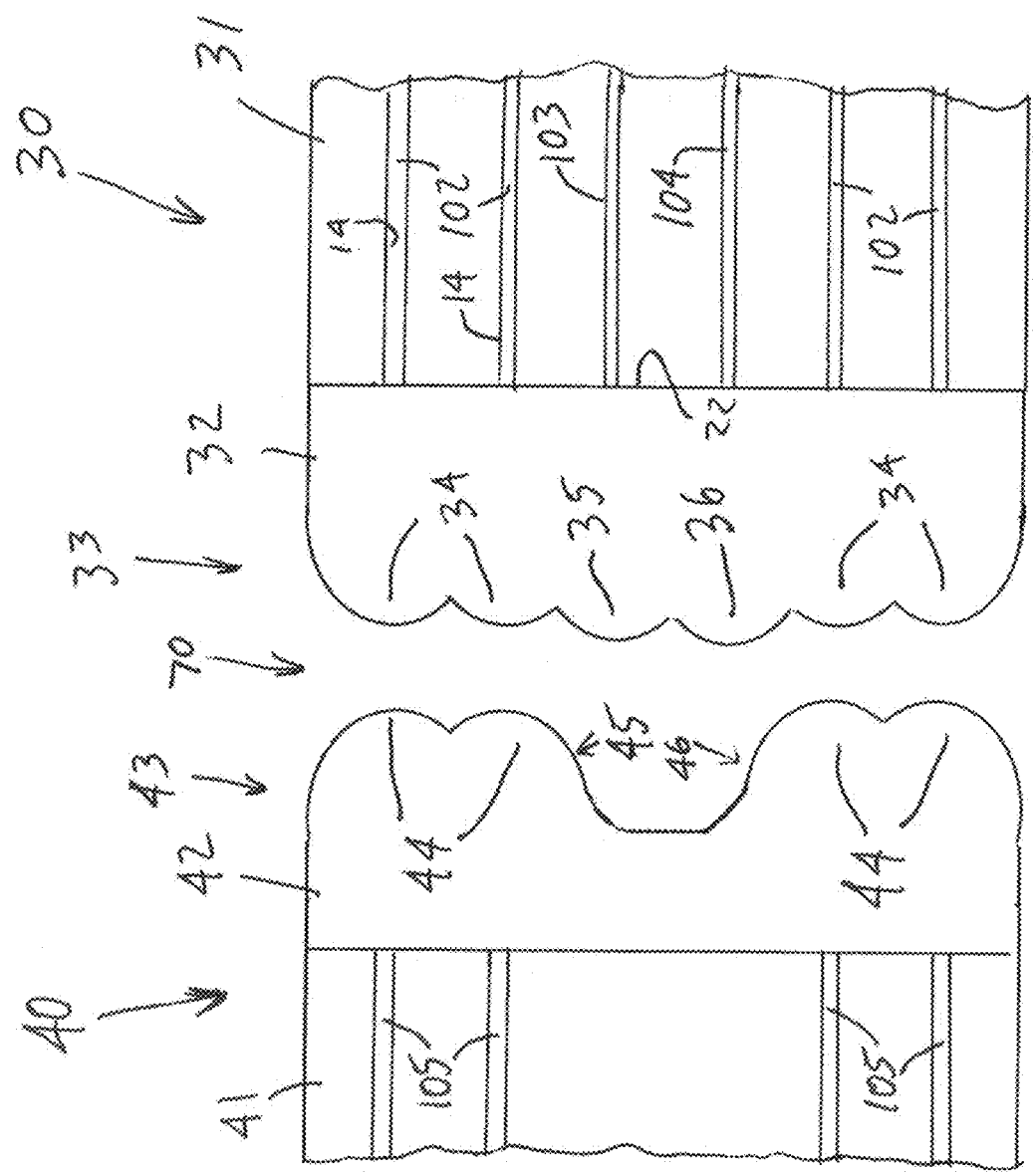
FIG. 2 depicts a schematic view of a portion of pair of mating ferrule assemblies incorporating the element arrays of the present disclosure.

The ferrule body 11 is generally rectangular and has a generally flat front face 12 and a rear face 13. As depicted, ferrule body 11 includes a row of six optical fiber receiving holes or bores 14 (FIG. 2) that extend through the ferrule body 11 from the rear face 13 to the front face 12. In addition, ferrule body 11 also includes a pair of alignment holes or receptacles 15 positioned on opposite sides of the array of fiber receiving holes 14 (FIG. 2). As depicted, alignment holes 15 are generally cylindrical and extend from front face 12 to rear face 13. Each alignment hole 15 is configured to receive a post therein to facilitate alignment when mating a pair of connectors.

Ferrule body 11 may be formed of a resin capable of being injection molded, such as polyphenylene sulfide or polyetherimide and may include an additive such as silica ($SiO_2$) to increase the dimensional characteristics, strength and stability of the resin. One of the optical fibers 101 of the multi-fiber cable 100 is positioned within each fiber receiving hole 14 and the front face 12 of the ferrule body 11 and the end faces of the optical fibers 101 adjacent the front face are polished to a desired finish.

Lens plate 20 is generally rectangular and has a front face 21 and a generally flat rear face 22 (FIG. 2). A recess 23 is centrally located in the front face 21 and includes a plurality of lens elements 24. Lens plate 20 also includes a pair of cylindrical guide holes or receptacles 25, configured to be aligned with the alignment holes 15 of ferrule body 11. Lens plate 20 may be formed of an optical grade resin that is capable of being injection molded with the refractive index closely matching that of the optical fibers 101.

In an expanded beam connector, two common types of lens elements are collimating or a cross-focusing. As described in more detail below, one of the ferrule assemblies 10 of the present disclosure includes both collimating and cross-focusing lens elements while the other includes only collimating lens elements. Each lens element 24 includes a convex shape projecting from the inner surface of recess 23 towards front face 21 of lens plate 20. Upon assembling the ferrule assembly 10, one lens element 24 is aligned with the end face of each optical fiber 101 located in the ferrule body 11.

The lens plate 20 may include any number and any combination of lens elements. In addition, the lens plate 20 may include other structures such as the mirror elements 45, 46, 145, 146 described below. Although depicted with the lens plate 20 being a component separate from and secured to the ferrule body 11, in embodiments, the lens elements may be integrally formed as part of the ferrule body. In other words, the array of lens elements and/or array of lens elements and mirror elements may be formed as part of a separate lens plate 20 secured to the ferrule body 11 or may be integrally formed with the ferrule body as part of a one-piece molded component. In such case, the combined ferrule body and lens plate may not include additives, such as those referenced above, that may inhibit the optical characteristics of the molded material.

FIGS. 2-7 each depict a schematic view of the optical portions of a pair of mating ferrule assemblies that each similar in many respects to the ferrule assembly 10 depicted in FIG. 1. Referring to FIG. 2, a first lensed ferrule assembly 30 is disposed opposite a second lensed ferrule assembly 40 with an air gap 70 therebetween. In such a configuration, the front faces (not shown) of the lens plates 32, 42 are in contact but the recessed nature of the lens element from the front faces provide for the air gap 70. Except with respect to their respective lens arrays 33, 43, each of the first and second lensed ferrule assemblies 30, 40 may be configured in a manner similar to the lensed ferrule assembly 10 described above.

The first lensed ferrule assembly 30 has a first ferrule body 31 with a first lens plate 32 secured thereto. The first lens plate 32 has a first hybrid lens or element array 33 that includes a plurality of lens elements disposed within the recess (not shown in FIG. 2) along the front face of the lens plate. Each of a plurality of first lens elements is configured as a collimating lens element 34 while each of a pair of second lens elements is configured as a cross-focusing lens element 35, 36. Each collimating lens element 34 receives light from its aligned optical fiber 102 secured with the first ferrule body 31 and expands the beam to a relatively large diameter that exits the lens element as a collimated beam.

The first cross-focusing lens element 35 receives light from its aligned optical fiber 103, expands it to a relatively large diameter, and then focuses the expanded light beam at a specific focal point after exiting the lens element. The second cross-focusing lens element 36 is aligned with an optical fiber 104 and may be configured identically or similarly to the first cross-focusing lens element 35. The focal length of each of the cross-focusing lens elements 35, 36 is selected to correspond to the distance between the cross-focusing lens element and an axially aligned mirror element as described in more detail below.

The second lensed ferrule assembly 40 has a second ferrule body 41 with a second lens plate 42 secured thereto. The second lens plate 42 has a second hybrid element array 43 that includes the recess (not shown) along the front face of the lens plate with a plurality of second collimating lens elements 44 together with first and second mirror elements 45, 46. Each of the second collimating lens elements 44 is aligned with an optical fiber 105 secured with the second ferrule body 42. Each mirror element 45, 46 is configured to redirect light, when properly focused, laterally or at a 90 degree angle. As a result, light traveling parallel to the mating axis of the first and second lensed ferrule assemblies 30, 40 is reflected to travel laterally and light traveling laterally is reflected to travel parallel to the mating axis 110. By positioning the pair of mirror elements 45, 46 adjacent to each other, the pair function together as a mirror system that redirects light in a direction opposite to and laterally offset from its original path.

Figure 3:
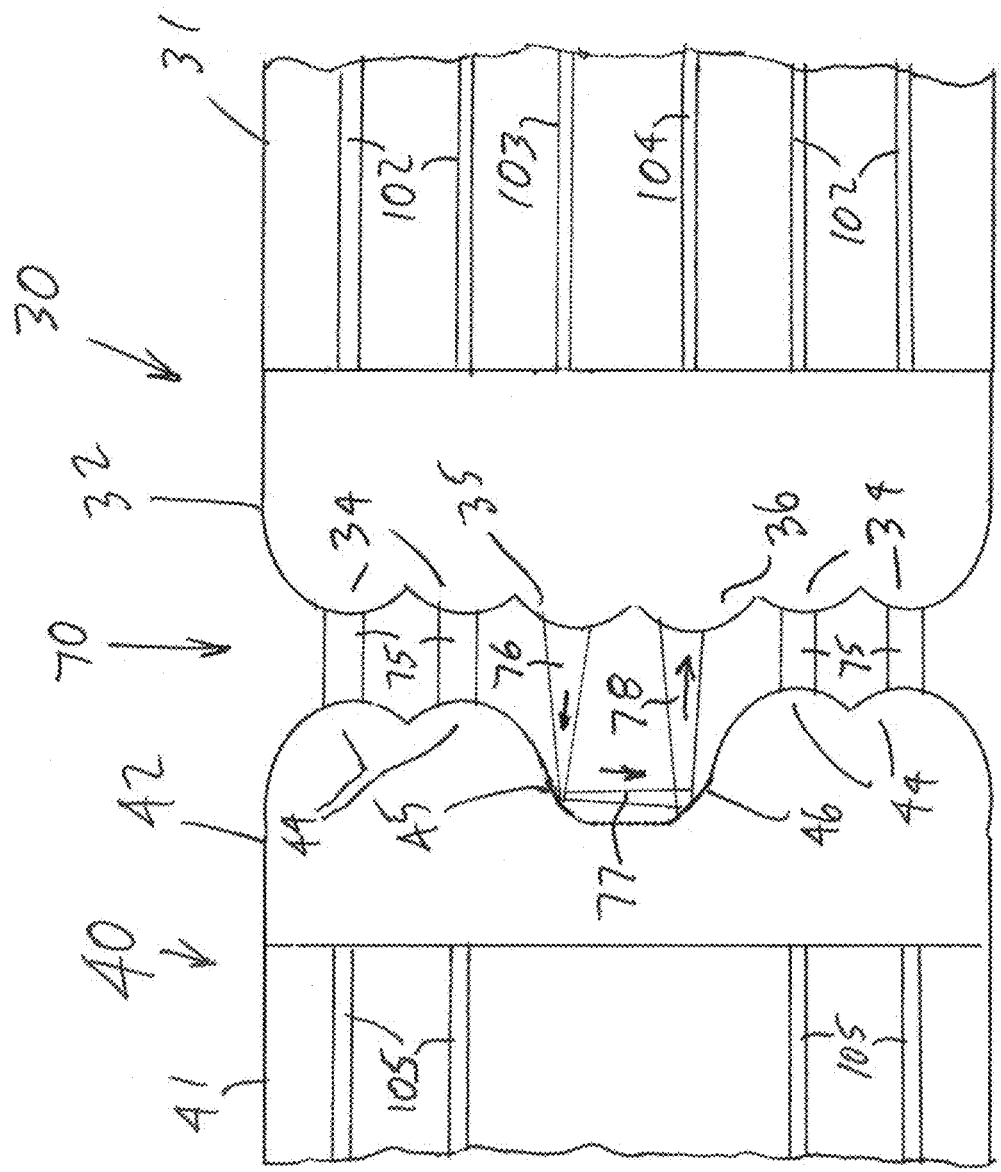
FIG. 3 depicts a schematic view similar to FIG. 2 but further depicting the light transmission between the mating ferrule assemblies.

Referring to FIG. 3, upon mating the first lensed ferrule assembly 30 with the second lensed ferrule assembly 40, light passing from each optical fiber 102 aligned with one of the first collimating lens elements 34 will expand as the light travels through the lens element and exit the lens element as a relatively large collimated beam as depicted at 75. Each collimated beam 75 will pass through the air gap 70 and reach a second collimating elements 44 where it is focused on an axially aligned optical fiber 105.

The combination of the cross-focusing lens elements 35, 36 and the mirror elements 45, 46 can operate as a signal or indicator as to whether the first and second lensed ferrule assemblies 30, 40 are fully mated together. For example, light passing from optical fiber 103 aligned with the first cross-focusing lens elements 35 exits the cross-focusing lens element as depicted at 76 and is transmitted to and focused on the first mirror element 45. The focal length of the cross-focusing lens element 35 is selected so that light exiting the cross-focusing lens element that is aligned with the first mirror element 45 is focused on the first mirror element.

The light is reflected by the first mirror element 45 at a 90 degree angle as depicted at 77 (i.e., laterally relative to the ferrule assembly axis 110) towards the second mirror element 46. The light is then reflected by the second mirror element 46 at a 90° angle as depicted at 78 towards the second cross-focusing lens element 36, which is aligned with the second mirror element 46. The light then enters the second cross-focusing lens element 36 and is re-focused on the optical fiber 104 aligned therewith. As a result of this configuration, light passing out of the first cross-focusing lens element 35 through the first and second mirror elements 45, 46 and back through the second cross-focusing lens element 36 can operate as a mating confirmation signal that is monitored to confirm that the first and second lensed ferrule assemblies 30, 40 are fully mated.

Figure 4:
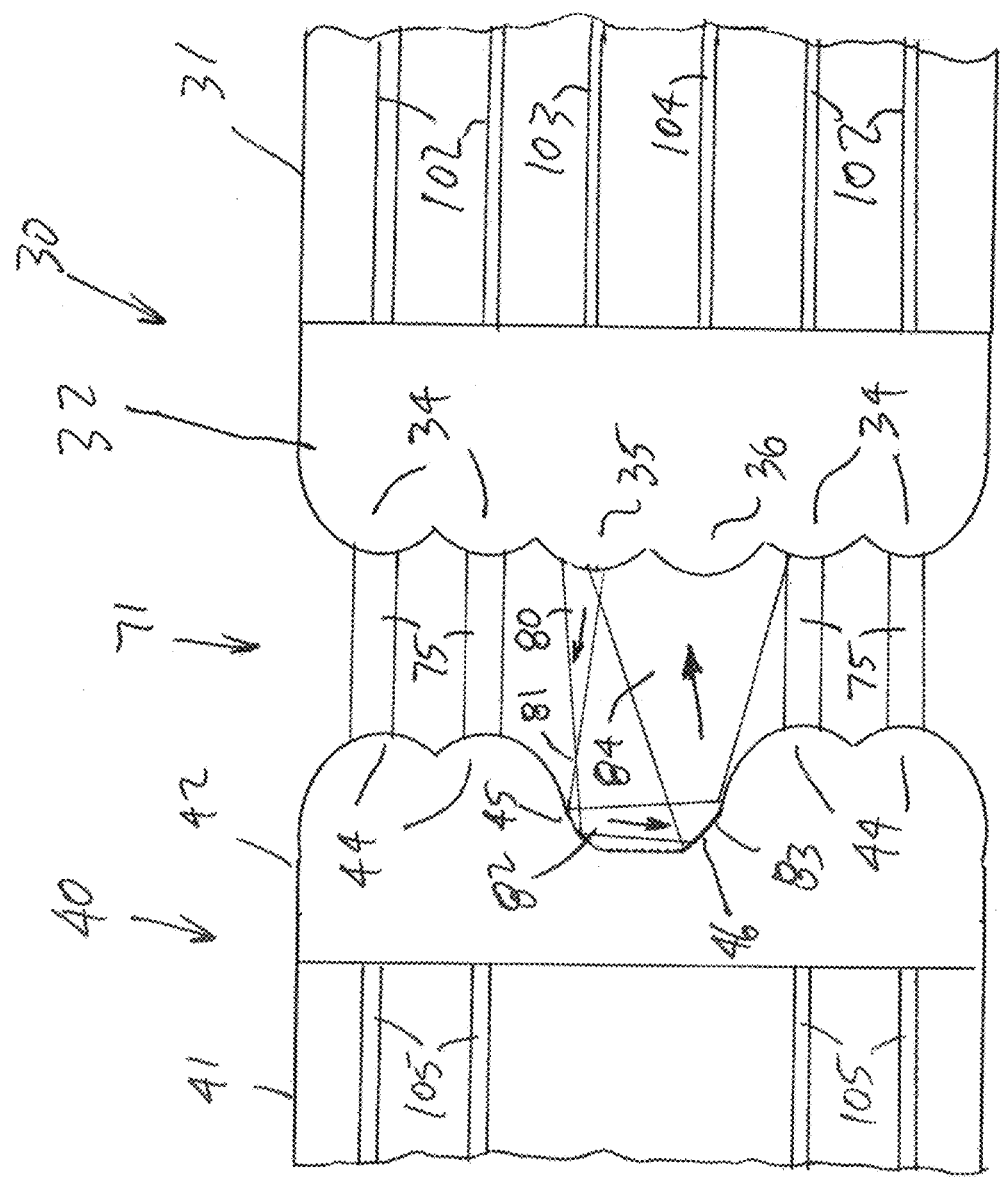
FIG. 4 depicts a schematic assembly similar to FIG. 3 but with the ferrule assemblies in a slightly unmated configuration.

Referring to FIG. 4, an example is depicted in which the first and second lensed ferrule assemblies 30, 40 are not fully mated as may be seen by the increased length of the air gap 71 but remain axially aligned. The partially unmated condition may not significantly degrade the signals transmitted through the collimating lens elements 34, 44 of the first and second lensed ferrule assemblies 30, 40 since due to the collimated nature of the light passing between the lens elements 34, 44. As a result, monitoring only the signals transmitted through the collimating lens elements 34, 44 may be indicate that the ferrule assemblies 30, 40 are not fully mated.

Accordingly, the first and second cross-focusing lens elements 35, 36 and the first and second mirror elements 45, 46 are configured to provide an indication that the ferrule assemblies 30, 40 are not fully mated. In doing so, the increase in distance between the ferrule assemblies 30, 40 will change the transmission characteristics between the first and second cross-focusing lens elements 35, 36 and the first and second mirror elements 45, 46. More specifically, light passing from the optical fiber 103 aligned with the first cross-focusing lens element 35 exits the cross-focusing lens element as depicted at 80 and is transmitted to the first mirror element 45. However, due to the greater distance between the first and second lensed ferrule assemblies 30, 40, the light exiting the first cross-focusing lens element 35 is not focused at the correct location relative to the first mirror element 45. In other words, the focal length of the first and second cross-focusing lens elements 35, 36 is shorter than the distance between each of the cross-focusing lens elements and its aligned mirror element 45, 46. As a result, the light exiting the first cross-focusing lens element 35 passes through the focal point depicted at 81 and expands or diverges until reaching the first mirror element 45.

The light is reflected by the first mirror element 45 at about a 90° angle as depicted at 82 and continues to expand or diverge as it reaches the second mirror element 46. The light is then reflected by the second mirror element 46 towards the first lens plate 32 at a 90° angle as depicted at 83 towards the second cross-focusing lens element 36. Since the light beam has been expanding after passing through its focal point 81, the light has substantially expanded beyond the second cross-focusing lens element 36 once it reaches the second hybrid element array 43 as depicted at 84. While the portion of the expanded light beam that reaches the second cross-focusing lens element 36 will be focused on its aligned optical fiber 104, the strength of the resulting signal within the optical fiber 104 will be substantially reduced and such reduction in power may be monitored to determine or signify that the first and second lensed ferrule assemblies 30, 40 are not fully mated.

Figure 5:
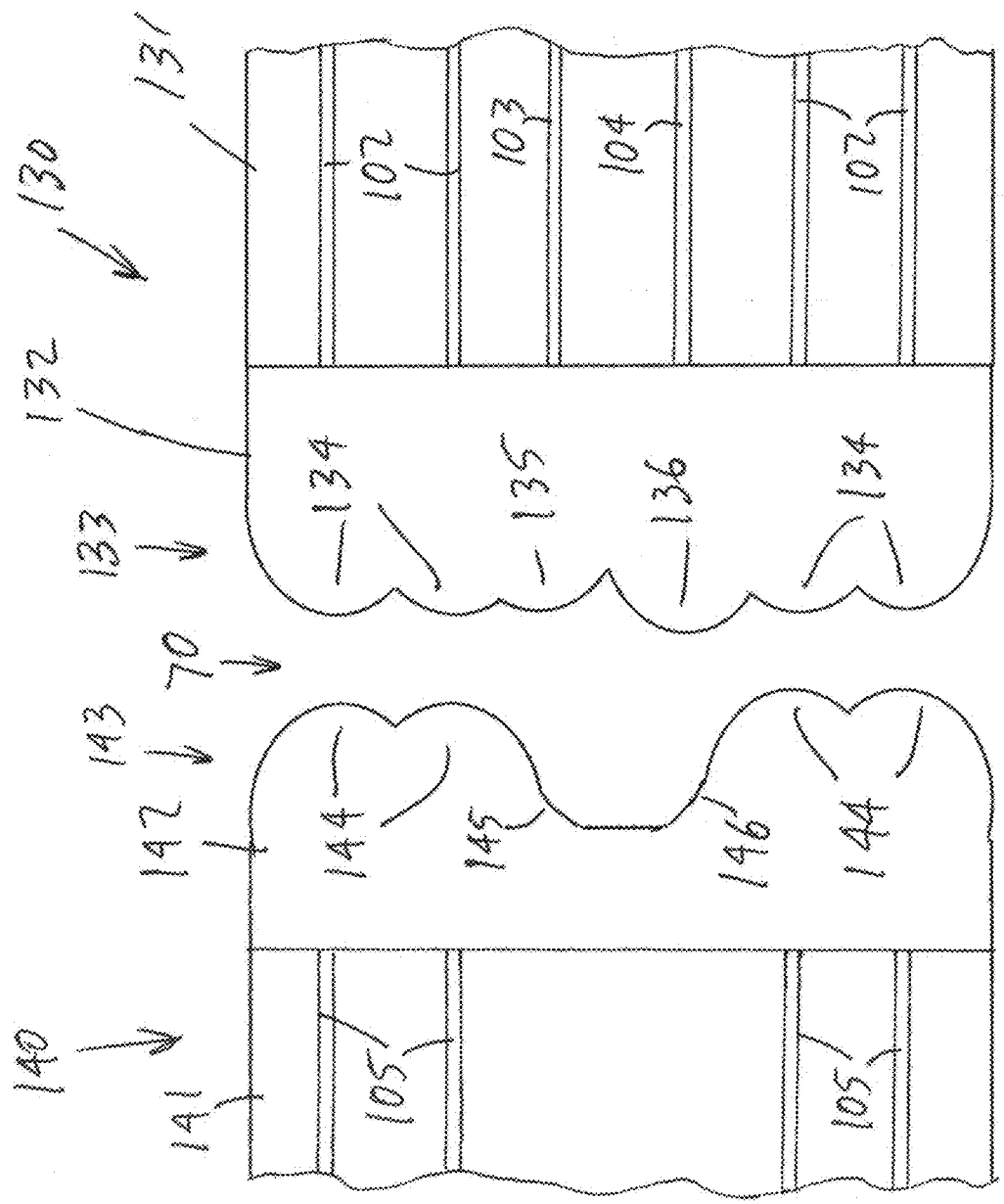
FIG. 5 depicts a schematic view of a portion of a pair of mating ferrule assemblies incorporating a second embodiment of an element array.
Figure 6:
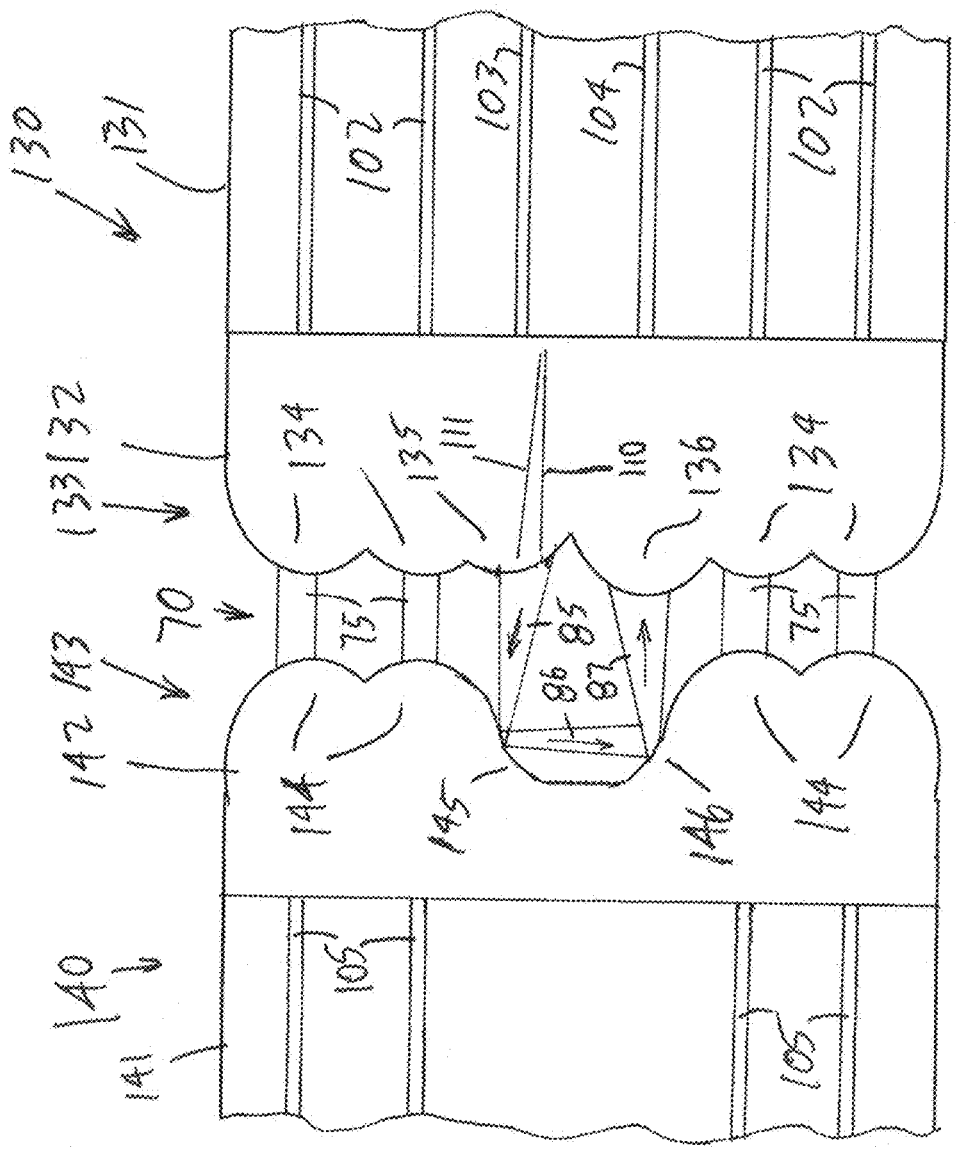
FIG. 6 depicts a schematic view similar to FIG. 5 but further depicting the light transmission between the mating ferrule assemblies.

In an alternate embodiment depicted in FIGS. 5-7, first and second ferrule assemblies 130, 140 are provided with modified first and second element arrays 133, 143 on first and second ferrule bodies 131, 142, respectively. The configuration of the first and second collimating lens elements 134, 144 is identical to the configuration of the first and second collimating lens elements 34, 44 in the embodiment of FIGS. 2-4.

However, the first and second cross-focusing lens elements 135, 136 are modified so that the axis 111 (FIG. 6) of at least one of the cross-focusing lens elements is offset from the ferrule assembly axis 110. In addition, the first and second mirror elements 145, 146 are modified to account for the variation in the angular orientation of the cross-focusing lens elements 135, 136. For example, as depicted at 85 in FIG. 6, the light exiting from the first cross-focusing lens element 135 exits at an angle to the ferrule assembly axis 110 and is focused on the first mirror element 145 at a location axially offset from the first cross-focusing lens element 135. Light is reflected by the first mirror element 145 laterally or almost laterally as depicted at 86 (i.e., not necessarily at a 90° angle) relative to the ferrule assembly axis 110. The light is then reflected by the second mirror element 146 as depicted at 87 towards the second cross-focusing lens element 146. The light entering the second cross-focusing lens element 35 is re-focused on the optical fiber 104 aligned therewith. Provided that the first and second lensed ferrule assemblies 130, 140 are fully mated, the light from the first cross-focusing lens element 135 will be reflected back through the second cross-focusing lens element 136 to signify that the first and second ferrule assemblies are fully mated.

However, referring to FIG. 7, an example is depicted in which the first and second lensed ferrule assemblies 130, 140 are not fully mated as may be seen by the increased length of the air gap 71 but remain axially aligned. In such case, the collimating lens elements 134, 144 of the first and second lensed ferrule assemblies 130, 140 may still function to send optical signals between the two assemblies due to the collimated nature of the light passing between the assemblies.

However, the increase in distance between the ferrule assemblies 130, 140 will change the transmission characteristics between the first and second cross-focusing lens elements 135, 136 and the first and second mirror elements 145, 146. More specifically, light passing from the optical fiber 103 aligned with the first cross-focusing lens element 135 exits the cross-focusing lens element as depicted at 90 and is transmitted towards the first mirror element 145. However, due to the greater distance between the first and second lensed ferrule assemblies 130, 140, the light exiting the first cross-focusing lens element 135 is not focused at the correct location relative to the first mirror element 145. In other words, the focal length of the first cross-focusing lens element 135 is shorter than the distance between the cross-focusing lens element and its aligned mirror element 145. As a result, the light exiting the first cross-focusing lens element 135 passes through the focal point depicted at 91 and expands or diverges until reaching the first mirror element 145. The light may be reflected by the first mirror element 145 at an angle to some extent laterally as depicted at 92 but is not reflected towards the second mirror element 146. Instead the light is reflected in a generally back towards the first lens array 133 rather than directly to the second cross-focusing lens element 136. Through such a structure, some the reflected light may be directed to the second cross-focusing lens element 136 but most of the light will not reach the second lens element. As a result, the amount of light reaching the second cross-focusing lens element 136 will be substantially reduced thus resulting in a substantial reduction in the amount of light subsequently focused on the aligned optical fiber 104. The resulting reduction in power may be monitored to determine or signify that the first and second lensed ferrule assemblies 130, 140 are not fully mated.

The first and second cross-focusing lens elements 135, 136 and the first and second mirror elements 145, 146 may have any desired configuration provided that the amount of light received by the second cross-focusing lens element is substantially reduced upon partially unmating of the first and second lensed ferrule assemblies 130, 140 such as by as little as 1 mm or less. For example, while the first mirror element 145 is configured so that the light from the first cross-focusing lens element 135 is not reflected towards the second mirror element 146, it is not necessary for the reflected light to avoid the second mirror element. In such case, the first and second mirror elements 145, 146 could be configured so that upon unmating the first and second lensed ferrule assemblies 130, 140, light that is reflected from the first mirror element 145 towards the second mirror element 146 is reflected by the second mirror element away from the second cross-focusing lens element 136.

In embodiments, the exact angles of the cross-focusing lens elements 35, 36, 135, 136 and the mirror elements 45, 46, 145, 146 may be less important than the resulting light transmission. In other words, the various angles of the 45, 46, 145, 146 may be selected provided that the desired resulting light transmission is achieved.

In order to improve the efficiency of the light transmission (i.e., reduce power loss) through each lens element 34-36, 44, 134-136, 144, it may be desirable to add an anti-reflective coating to the lens plates 32, 42, 132, 142 or to just the element arrays 33, 43, 133, 143. However, the application of an anti-reflective coating to the mirror elements 45, 46, 145, 146 may be counterproductive. Accordingly, in an embodiment, an anti-reflective coating may be applied to only the first lens plate 32, 142 or the first element array 33, 133, which includes collimating lens elements 34, 134 and cross-focusing lens elements 35, 36, 135, 136. In embodiments, In embodiments, in order to reduce the risk of ocular damage caused by light transmission through an unmated ferrule assembly, it may be desirable to transmit light along the channels that have the collimated lens elements 34, 44, 134, 144 at an operating wavelength of 850 nm, for example, while light transmitted is transmitted at a different indicator wavelength of 1310 nm, for example, along the channels that have the cross-focusing lens elements 35, 36, 135, 136. In such case, it would be desirable to utilize an anti-reflective coating that passes light at both 850 nm and 1310 nm equally well. The anti-reflective coating can be a custom or standard coating that is chosen to provide the particular reflectance required. An example of such an anti-reflective coating is NIR (750-1550). Other wavelengths and other anti-reflective coatings may be utilized.

In another embodiment, a first anti-reflective coating may be applied to the first lens plate 32, 132 or to just the first element arrays 33, 133 and a second anti-reflective coating may be applied to the second lens plate 42, 142 or to just the second element arrays 43, 143. The first anti-reflective coating may be identical to that described above. The second anti-reflective coating may be configured with a different bandpass than the first anti-reflective coating. The second anti-reflective coating may function to eliminate reflection with respect to the operating light passing through the collimated lens elements 34, 44, 134, 144. Accordingly, the operating light that passes through the first element arrays 33, 133 and through the second element arrays 43, 143 will receive the benefit of both the first and second anti-reflective coatings. However, the indicator light that passes through the first cross-focusing lens element 35, 135, is reflected by the first and second mirror elements 45, 46, 145, 146, and then passes through the second cross-focusing element 36, 136, will receive the benefit of the first anti-reflective coating as it passes through the cross-focusing lens elements 35, 36, 135, 136 but will not suffer reduced reflectivity as it is reflected by the first and second mirror elements 45, 46, 145, 146 of the second element arrays 43, 143. The anti-reflective coatings can be custom or standard coatings that are chosen to provide the particular reflectance required. An example of the second anti-reflective coating is NIR (600-1050).

Although each of the first and second ferrule assemblies 30, 40, 130, 140 is depicted as having pairs of cross-focusing lens elements 35, 36, 135, 136 and mirror elements 45, 46, 145, 146, such ferrule assemblies may include only a single cross-focusing lens element and/or a single mirror element. For example, referring to FIG. 8, an alternate embodiment of a full mating detection system 220 is depicted. The full mating detection system 220 is configured as a first ferrule assembly 230 having a single cross-focusing lens element 235 and a second ferrule assembly 240 having a mirror system configured as a single mirror element 245. The cross-focusing lens element 235 may be formed as part of a first lens plate 232 operatively associated with the first ferrule body 231. The mirror element 245 may be formed as part of the second lens plate 242 operatively associated with the second ferrule body 241. As depicted, the first ferrule body 231 is integrally formed as a one-piece monolithic member with the first lens plate 232 as are the second ferrule body 241 and second lens plate 242, respectively.

The cross-focusing lens element 235 is configured in a manner similar to the cross-focusing lens element 135 with the axis 112 of the lens element 235 disposed at an angle 115 to the axis 113 of the optical fiber 103. As a result of the angle 115 of the axis 112 of the cross-focusing lens element 235, the beam 93 exits the lens element at an angle towards the mirror element 245.

The mirror element 245 is configured to reflect the light beam 93 back towards the cross-focusing lens element 235 along the same path that the light traveled from the cross-focusing lens element. As a result, the reflected light beam 94 overlaps with the light beam 93 and reenters the cross-focusing lens element 235. Accordingly, a splitter 250 having first and second legs 251, 252 is provided so that a percentage of the light passing back through the optical fiber 105 is transmitted back through the second leg 252 to a detector (not shown). In other words, an input beam 95 is provided along the first leg 251 of the splitter 250 and travels along the optical fiber 103 towards the cross-focusing lens element 235. The light exits the cross-focusing lens element 235 as light beam 93 along axis 113 towards the mirror element 245. The light is reflected by the mirror element 245 as light beam 94 along the same path towards the cross-focusing lens element 235. The light is refocused by the cross-focusing lens element 235 back to the optical fiber 103 where it travels back towards the splitter 250 and a percentage is directed back along the second leg 252 to a detector (not shown).

Referring to FIG. 9, the first ferrule assembly 230 and the second ferrule assembly 240 are not fully mated as may be seen by the increased distance 271 between the cross-focusing lens element 235 and the mirror element 245. As a result of the increased distance 271, the light beam 93 exiting the cross-focusing lens element 235 is not focused on the mirror element 245. More specifically, as a result of the increased distance 271, the light beam 93 passes to the side of the mirror element 245 without being reflected back to the cross-focusing lens element 235. Without the light being reflected back to the cross-focusing lens element 235, light does not travel back along the optical fiber 103 to the splitter 250 and back to the detector (not shown).

Other embodiments are contemplated. For example, a single cross-focusing element lens element such as lens element 235 could be used with a pair of mirror elements 145, 146 by appropriately configuring the axis 113 of the lens element and the mirror elements.

Further, a full mating detection system having at least one cross-focusing lens element and a mirror system including at least one mirror element may be used with non-optical structures to determine when and if they become slightly unmated. Referring to FIGS. 10-11, a hydraulic hose assembly 270 is depicted having a first hose coupling member 271 and a second mating hose coupling member 272. The first and second hose coupling members 271, 272 can include a sealing system 273 such as the depicted O-rings 274 and the full mating detection system 220 of FIG. 8. More specifically, the first hose coupling member 271 includes the cross-focusing lens element 235 and the second hose coupling assembly 272 includes the mirror element 245 disposed thereon. Upon fully mating the first and second hose coupling members 271, 272, the optical signals will be reflected back through the full mating detection system 275 as described above. If the first and second hose coupling members 271, 272 are not fully mated, a optical signals will not be reflected back through the full mating detection system 275.

It will be appreciated that the foregoing description provides examples of the disclosed system and technique. For example, although depicted as part of an MT-type ferrule assembly, the foregoing is applicable to any type of ferrule system including those with any type of alignment system.

All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A ferrule assembly having a mating axis, comprising:
    a ferrule body having a front face and a plurality of optical fiber receiving bores;
    an element array adjacent the front face of the ferrule body, the element array having a plurality of data lens elements and a mirror system, each data lens element being aligned with one of the optical fiber receiving bores, and the mirror system being configured to reflect light from a mating ferrule assembly; and
    a plurality of optical fibers, each optical fiber being disposed within one of the optical fiber receiving bores, each optical fiber having an end face adjacent one of the data lens elements.

2. The ferrule assembly of claim 1, wherein the mirror system is configured to redirect light from an input path along a first direction to an output path in a second direction opposite the first direction.

3. The ferrule assembly of claim 2, wherein the output path is laterally offset from the input path.

4. The ferrule assembly of claim 1, wherein the mirror system comprises a pair of adjacent mirror elements.

5. The ferrule assembly of claim 4, wherein the mirror system is configured to receive at a first mirror element light from an input path along a first direction, reflect the light to a second mirror element, and reflect the light to an output path in a second direction opposite the first direction.

6. The ferrule assembly of claim 5, wherein the output path is laterally offset from the input path.

7. The ferrule assembly of claim 2, wherein the mirror system comprises at least one mirror element.

8. The ferrule assembly of claim 2, wherein the data lens elements are collimating lenses.

9. An optical fiber assembly comprising:
    a first ferrule assembly having a first mating axis, the first ferrule assembly including:
        a first ferrule body having a first front face and a plurality of first optical fiber receiving bores;
        a first element array adjacent the first front face of the first ferrule body, the first element array having a plurality of lens elements, each lens element being aligned with one of the first optical fiber receiving bores, the first element array comprising a plurality of data lens elements and an indicator lens element, the indicator lens element being a cross-focusing lens; and
a plurality of first optical fibers, each first optical fiber being disposed within one of the first optical fiber receiving bores, each first optical fiber having an end face adjacent one of the lens elements; and
a second ferrule assembly having a second mating axis, the second ferrule assembly including:
a second ferrule body having a second front face and a plurality of second optical fiber receiving bores;
a second element array adjacent the second front face of the second ferrule body, the second element array having a plurality of data lens elements and a mirror system, each data lens element being aligned with one of the second optical fiber receiving bores, and the mirror system being configured to reflect light from the indicator lens element of the first ferrule assembly; and
a plurality of second optical fibers, each second optical fiber being disposed within one of the second optical fiber receiving bores, each second optical fiber having an end face adjacent one of the data lens elements.

10. An assembly comprising:
a first assembly having a first mating axis, the first assembly including:
a first body having a first front face and an optical fiber receiving bore, an optical fiber axis extending through the bore;
a cross-focusing lens element adjacent the first front face of the first body, a lens axis of the lens element being at an angle to the optical fiber axis; and
an optical fiber disposed within the optical fiber receiving bore, the optical fiber having an end face adjacent the lens element; and
a second assembly having a second mating axis, the second assembly including:
a second body having a second front face;
a mirror system adjacent the second front face of the second body, the mirror system being aligned with the lens axis when the first assembly and the second assembly are disposed in a fully mated configuration.

11. The assembly of claim 10, wherein upon positioning the first assembly and the second assembly in the fully mated configuration, the first and second mating axes are aligned, light transmitted from the cross-focusing lens element is reflected by the mirror system, and upon positioning the first assembly and the second assembly in a partially mated configuration, the first and second mating axes are aligned, light transmitted from the cross-focusing lens element is not reflected by the mirror system to the cross-focusing lens element.

12. The assembly of claim 10, wherein upon positioning the first assembly and the second assembly in a fully mated configuration, the light transmitted from the cross-focusing lens element is reflected by the mirror system back to cross-focusing lens element.

13. An optical fiber assembly comprising:
a first ferrule assembly having a first mating axis, the first ferrule assembly including:
a first ferrule body having a first front face and a plurality of first optical fiber receiving bores;
a first element array adjacent the first front face of the first ferrule body, the first element array having a plurality of lens elements, each lens element being aligned with one of the first optical fiber receiving bores, the first element array comprising a plurality of first data lens elements and an indicator lens element, the indicator lens element being a cross-focusing lens with a first focal length; and
a plurality of first optical fibers, each first optical fiber being disposed within one of the first optical fiber receiving bores, each first optical fiber having an end face adjacent one of the lens elements; and
a second ferrule assembly having a second mating axis, the second ferrule assembly including:
a second ferrule body having a second front face and a plurality of second optical fiber receiving bores;
a second element array adjacent the second front face of the second ferrule body, the second element array having a plurality of second data lens elements and a mirror system, each second data lens element being aligned with one of the second optical fiber receiving bores, and the mirror system being configured to reflect light from the indicator lens element of the first ferrule assembly; and
a plurality of second optical fibers, each second optical fiber being disposed within one of the second optical fiber receiving bores, each second optical fiber having an end face adjacent one of the second data lens elements; and
upon positioning the first ferrule assembly and the second ferrule assembly in a fully mated configuration, the first and second mating axes are aligned, each of the first data lens elements is axially aligned with one of the second data lens elements, the indicator lens element is aligned with the mirror system, and the indicator lens element is a first distance from the mirror system, the first distance being equal to the first focal length,
upon positioning the first ferrule assembly and the second ferrule assembly in a partially mated configuration, the first and second mating axes are aligned, each of the first data lens elements is axially aligned with one of the second data lens elements, the indicator lens element is aligned with the mirror system, and the indicator lens element is a second distance from the mirror system, the second distance being greater than the first focal length.

14. The optical fiber assembly of claim 13, wherein the first element array comprises a pair of indicator lens elements, a first of the indicator lenses being operative as an input path and a second of the indicator lenses being operative as an output path, and while in the mated configuration, upon transmitting light through the input path along a first direction, the light is reflected by the mirror element and primarily directed to the output path in a second direction opposite the first direction, and while in the partially mated configuration, upon transmitting light through the input path along a first direction, the light is not primarily reflected by the mirror element to the output path in a second direction opposite the first direction.

15. An optical fiber assembly of claim 13, wherein each first data lens element is a collimating lens element and each second data lens element is a collimating lens element.

16. An optical fiber assembly of claim 15, further comprising a pair of indicator lens element.

17. A ferrule assembly having a mating axis, comprising:
a ferrule body having a front face and a plurality of optical fiber receiving bores;
an element array adjacent the front face of the ferrule body, the element array having a plurality of lens elements, each lens element being aligned with one of the optical fiber receiving bores, the element array comprising a plurality of data lens elements and an indicator lens element, the data lens elements being collimating lenses and the indicator lens element being a cross-focusing lens; and a plurality of optical fibers, each optical fiber being disposed within one of the optical fiber receiving bores, each optical fiber having an end face adjacent one of the lens elements.

18. The ferrule assembly of claim 17, wherein the element array comprises a pair of indicator lens elements.

19. The ferrule assembly of claim 17, wherein an axis of the indicator lens element is parallel to the mating axis.

20. The ferrule assembly of claim 17, wherein an axis of the indicator lens element is at an angle to the mating axis.

* * * * *